Patented May 12, 1953

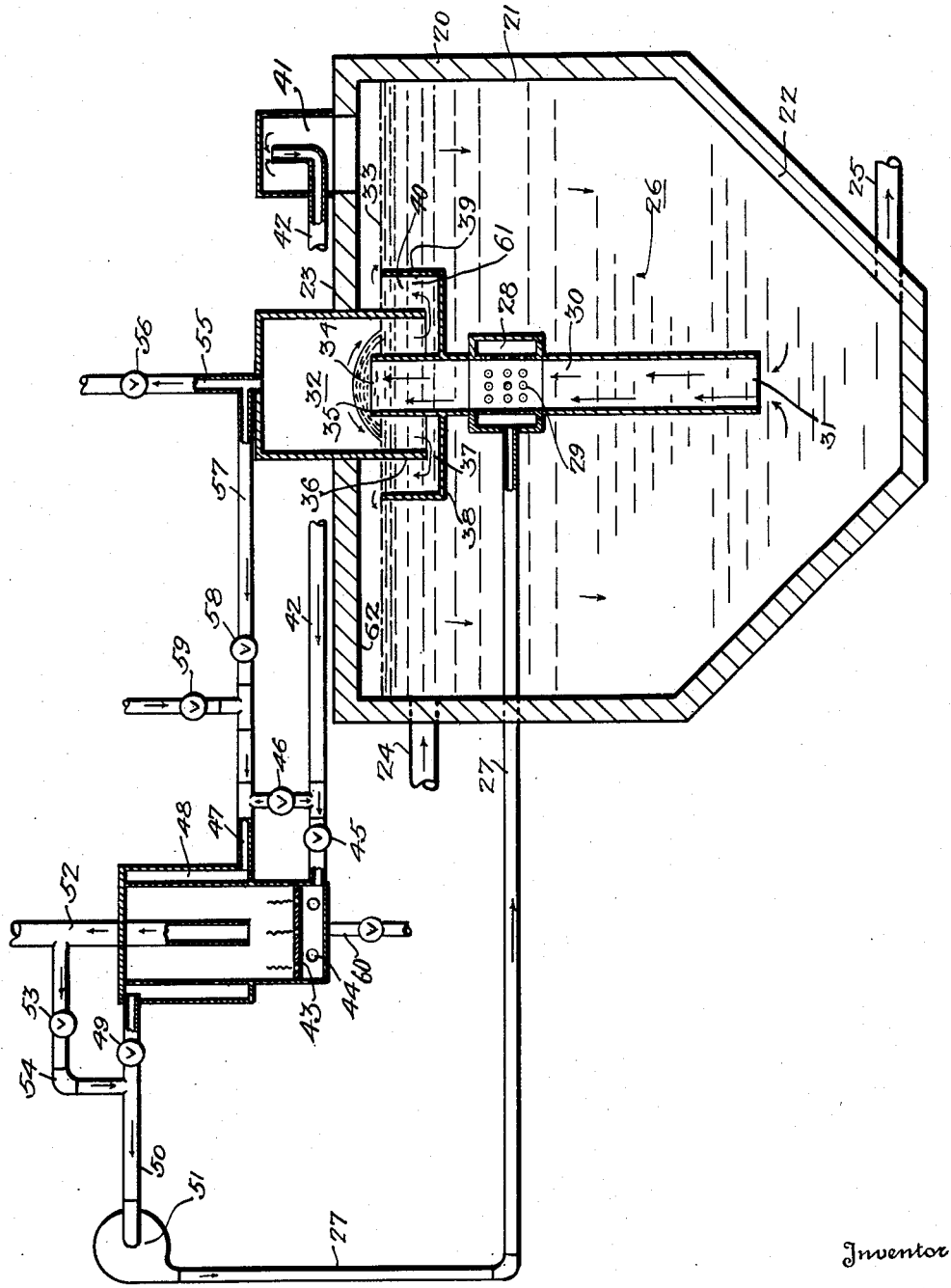

2,638,444

UNITED STATES PATENT OFFICE 2,638,444

SEWAGE DIGESTER

Stanley E. Kappe, Washington, D. C.

Application August 2, 1949, Serial No. 108,125

2 Claims. (Cl. 210—2)

My invention relates to processes and apparatus for digestion of sewage sludge and the like.

A purpose of my invention is to simplify the construction and improve the operation of sewage digesters.

A further purpose is to obtain improved agitation of sewage sludge undergoing digestion, while avoiding mechanical difficulty and inconvenience in connection with the stirring means.

A further purpose is to improve the efficiency of heating of sewage sludge undergoing digestion.

A further purpose is to avoid the accumulation of a hard and impervious scum or crust on sewage sludge undergoing digestion.

A further purpose is to collect and draw off gas from a sewage sludge digester, preferably operating under anaerobic conditions, and to pass that gas upwardly through the sewage sludge in the digester in a stirring column, and preferably also to heat the gas so as to maintain the most favorable conditions for digestion in the digester.

A further purpose is to anaerobically digest sewage sludge and to stir and preferably also heat the sludge during digestion by gas passed through the sludge in quantity and character not interfering with the maintenance of anaerobic conditions.

A further purpose is to collect and draw off gas from an anaerobic sludge digester, to burn part or all of the gas, using the heat developed preferably to heat another part of the gas or other gas, and to pass through the sludge being digested either the gas heated, or the products of combustion from the burning, or both the gas heated and the products of combustion.

A further purpose is to employ a gas stirring column, preferably a gas lift, in a sewage sludge digester.

A further purpose is to stir sewage sludge in a digester by gas preponderantly derived from anaerobic digestion, to liberate and collect the gas used in stirring, preferably to heat such gas, and to recirculate it in a gas lift through the sludge to produce further stirring.

A further purpose is to maintain flow of liquid, preferably of sewage sludge, along the top of the sewage sludge in a digester to prevent the formation of a hard or impervious scum or cake layer at the top.

A further purpose is to cause the sludge to well up at a point on the surface of a sewage sludge digester and flow outward over a weir from such point along the surface, preferably by means of a gas lift.

A further purpose is to collect the gas employed in a gas lift separately from gas generated in a digester.

A further purpose is to extend a baffle connected with a gas collector below a weir adjacent the surface of a sewage sludge digester, and to carry the sludge passing under the baffle up to approximately the surface by another baffle before introducing it into the digester.

Further purposes appear in the specification and in the claims.

In the drawings I have chosen to illustrate one only of the numerous embodiments in which my invention might appear, selecting the form shown from the standpoints of convenience in illustration, satisfactory operation and clear demonstration of the principles involved.

The figure is a diagrammatic central vertical section of the improved sludge digester employed in my invention.

Describing in illustration but not in limitation and referring to the drawing:

In sewage treatment the solids removed from sewage are conveyed to a container known in the art as a digester or digestion tank. While the digester may be operated aerobically, it is preferable in most cases to employ anaerobic digestion, in which, normally under controlled conditions of temperature, anaerobic bacteria through liquidation and gasification digest the sewage sludge and thus materially reduce the quantity of solids present in the digester.

The organic decomposition accomplished in anaerobic digestion is accompanied by the evolution of gas of considerable calorific power. Since decomposition is greatly accelerated when the temperature in the digester is of the order of 85° F. or higher, one common use of the gas has been to heat the sewage sludge being decomposed, by means of a hot water heating system.

During the process of digestion, a scum layer or crust has in prior practice formed at the liquid level in the digester. This scum has become so hard and impervious as to prevent escape of gas. Accordingly costly equipment has been installed to remove or reduce the formation of such scum. The special devices for scum removal have not always proved satisfactory and it has been necessary in many cases to remove the scum layer manually from the digester.

By the present invention it is possible to prevent the formation of objectionable amounts of scum, and to stir and preferably also heat the contents of the digester at the same time.

The digester 20 comprises a suitably circular basin 21 having a hopper bottom 22 and a roof or cover 23. Sewage sludge is introduced through a suitable conduit 24 and after digestion is removed for disposal through a suitable conduit 25. As shown, the conduit 24 is adjacent the top and the conduit 25 is adjacent the bottom, as this is the preferred arrangement.

In the prior art the sludge 26 in the digester has normally been heated by hot water coils installed in the digester or by one of a variety of schemes for drawing off part of the sludge from the digester to an external heater, heating it and returning it to the digester. These devices have been costly and have required the operation of mechanical sludge pumps to recirculate the contents of the digester and mix the sludge introduced into the digester with the bacteria and sludge already contained therein so as to obtain rapid digestion.

In accordance with the present invention, the sludge 26 is heated by hot gases introduced by a conduit 27 into a chamber 28 within the digester, and thence through suitable multiple jets 29 into a desirably vertical tubular stirring column 30, preferably at the center of the digester. It will be evident that the walls of the stirring column 30 will be preferably though not necessarily tubular, and that the chamber 28 and jets 29 will surround the stirring column 30.

Hot gases introduced at the jets 29 not only heat the sludge 26 but also create a gas lift which causes sludge 26 to enter the stirring column 30 at the inlet 31 suitably downwardly directed adjacent the bottom of the digester. Sludge in the stirring column is carried upward as indicated by the arrows and discharged into a chamber 32 suitably above the level 33 of the sludge by a discharge opening 34 in the top of the stirring column. The walls of the upwardly directed discharge opening 34 desirably form a weir 35, preferably of annular horizontal shape, located adjacent to, and preferably as shown slightly above the surface 33 of the sludge, to assist in maintaining the scum on the surface moist as later explained. It will thus be evident that the sludge is not only heated but also recirculated or stirred without the necessity of introducing mechanical pumping equipment handling the sludge.

The gas used in stirring and any gas generated by the sludge in the column 30 is liberated into the chamber 32. As shown, the chamber 32 is preferably of bell form having a downwardly extending bottom wall or baffle 36 below the level of the weir and below the liquid level, suitably annularly surrounding the weir. Below the bottom of the baffle 36 a suitably annular outwardly extending discharge opening 37 is provided for the sludge between the vertical baffle 36 and a horizontal baffle 38.

Outside of and preferably surrounding the baffle 36 I provide an upwardly extending baffle 39, supported on the horizontal baffle 38, and between this baffle and the baffle 36 I provide a desirably annular passage 40 for the outwardly flowing sludge.

It will be evident that sludge taken from the digester through the inlet 31 of the stirring column 30 will well up at 34 over the weir, and then flow beneath the downward baffle 36 and over the upward baffle 39, returning to the digester, and tending to flow downward in the direction of the arrows in the digester proper.

Since the sludge raised by the gas lift is returned to the digester at or about the level of the liquid in the digester, it will flow over the surface of the scum in the digester outwardly from the point of welling up at 34, constantly wetting the surface scum and preventing it from drying, as well as continuously feeding the scum with bacteria, and mechanically dispersing the scum due to the action of the flow and the weight of the sludge which is pumped continuously over the scum surface, thus effectively eliminating the difficulty previously encountered with scum accumulation and caking. At the same time the scum, instead of being cool as in previous practice will be kept warm and in a condition most favorable for digestion by the freshly heated sludge pumped over it. The continuous wetting of the scum will prevent the scum from becoming impervious to gas and allow gas to escape freely from the digester 20 into a collecting chamber 41 suitably located above the level 33 of the scum at a convenient point in the roof or cover 23. It will be noted that the collecting chamber 41 is separate from the chamber 32, and whereas the chamber 32 primarily collects gases employed in the gas lift, the chamber 41 primarily collects gases resulting from the digestion and outside of the gas lift. The baffle 36 of the chamber 32 forms an effective gas seal between the chamber 32 and the digester proper.

From chamber 41 the gases collected are conveyed by conduit 42 (broken away to prevent interference in the drawing with the chamber 32) to a suitable means for recirculating and preferably heating the gas to be recirculated. Since in the preferred form anaerobic digestion is employed, the gas in the conduit 42 is preferably carried to a burner 43 having air inlet at 44, as by opening a valve 45 and closing a valve 46. The air introduced at 44 to the burner 43 is preferably closely controlled to avoid an excess or to introduce slightly less air than would be required for complete combustion, so that the tendency to dissolve oxygen in the sludge passing through the gas lift will be minimized, and little or no interference with anaerobic digestion will occur.

In many cases it will be desirable to introduce a portion of the gas from the conduit 42 into a conduit 47, by opening valve 46. From conduit 47 this gas is carried through a heating chamber 48 surrounding the burner 43, where it can be reheated by heat developed in the burner. From the chamber 48, by opening a valve 49, the heated gas is carried through a conduit 50 and a blower 51 to the conduit 27 supplying the gas lift.

The gases passing from the burner 43 through a stack 52 may be allowed to escape to the atmosphere or may, if preferred, to any desired extent be drawn off through a valve 53 and conduit 54 to pass through the conduit 50 and a blower 51 to the gas lift. By opening and closing valves 49 and 53 selectively it is possible to introduce to the gas lift entirely stack or combustion gas, or entirely gas from the digester which has not been burned, or any proportion or combination of these. By this means it will be possible to control the extent to which oxygen from the air employed in combustion will be introduced.

Gas used in the gas lift may be rejected to atmosphere or conveyed to any other use through conduit 55 and valve 56. In most cases however valve 56 may remain partially or wholly closed and such gas can be passed through conduit 57 and valve 58 to conduit 47 for heating in the chamber 48 and subsequent introduction into the gas lift through the blower. Thus the gas may be used over and over again to the extent that is desired in the particular operation, while any excess may be carried away through the valve 56. If the gas passed to the burner does not include gas once passed through the gas lift, build up of products of combustion in the gas passing through the gas lift will not become a problem from the standpoint of combustion.

In some cases it may be desired to employ in the gas lift gas derived from other sources, as for example gas from other digesters which may be operating under phases of the digestion cycle more favorable to gas evolution, combustion gases whose oxygen content has been depleted by the combustion process, or even air where aerobic digestion is being used or where the liberation of gas in the chamber 32 is sufficiently complete and the oxygen absorption by the sludge low enough so that the gas used in the gas lift does not interfere with anaerobic digestion. Introduction of gas from any such source may be accomplished through a valve 59 to conduit 47. In some cases the gas introduced through the valve 59 may be the sole source of gas to the gas lift. Also where the gas introduced is a combustible gas, it may be burned in the burner 43 and also passed through the gas lift.

I show at 60 an auxiliary fuel feed for introducing oil or the like to the burner 43 when a shortage of combustible gas occurs.

It will thus be evident that a wide selection is offered of gases which may be used as the stirring medium and preferably also of the medium to conduct heat to the digester. Such gases may be gases previously used in the gas lift or gases not so used. They may be gases derived from the digester, or gases derived from other digesters, or from other sources, even air with or without diminution of its oxygen content. The gases employed in the gas lift may be gases of combustion with or without admixture with heated gases derived from the digester or from other sources.

It will be evident that the points of inlet and outlet from the stirring column 30 can be adjusted as desired to suit the requirements of the particular digester.

It will be desirable to use care in the design of the weir 35 and gas collecting chamber 32, including the baffle 36, so as to obtain most efficient liberation of gas used in the gas lift before the sewage sludge is returned to the digester. With this in view the baffle 36 is preferably submerged some distance below the liquid level 33 so that the mixture of gas and liquid discharged over the weir and flowing in the space 61 between the weir and the baffle will be sufficiently quiescent to allow the gas to separate from the liquid, rise and collect in the chamber 32. The horizontal baffle 38 and the upwardly directed baffle 39 then return the heated sludge to a point adjacent the liquid level before it enters the digester. In some cases the liquid level may rise as high as the under surface 62 of the roof 23.

It should be noted that caution should be used in introducing atmospheric air into the gas lift, as in case effective separation does not take place while the liquid is flowing through the space 61 between the baffle and the weir, an explosive mixture may be created in the digester above the liquid. Accordingly adequate precautions against fire hazard may be important.

Where in the particular installation it is desired to employ only unburned gases derived from the digester without introduction of atmospheric air or combustion gases, it will be evident that the baffles may be eliminated if desired, although it is preferred to employ the baffles so that the gas used in the gas lift can be maintained separate from the gas liberated in the digester even in that case.

It will be evident that by the present invention, it is possible to operate the digester indefinitely or for a prolonged period without cleaning of scum or cleaning of heating pipes or the like, and without loss of efficiency due to coating of heating pipes and interference with heat transfer.

In view of my invention and disclosure variations and modifications to meet individual whim or particular need will doubtless become evident to others skilled in the art, to obtain all or part of the benefits of my invention without copying the process and structure shown, and I therefore, claim all such insofar as they fall within the reasonable spirit and scope of my claims.

Having thus described my invention what I claim as new and desire to secure by Letters Patent is:

1. In a sludge digester, in combination with a weir adjacent the surface of the sludge in the digester, a gas lift tube below the weir and connected therewith supplying sludge which flows over the weir and on to the sludge in the digester, a dished receptacle having an upwardly directed baffle surrounding the weir, a gas collector above the weir having a baffle extending into the space between the weir and the baffle on the dished receptacle to a level below the weir and the baffle on the dished receptacle and a separate gas collector above the sludge in the space outside the gas collector first mentioned.

2. A sludge digester in combination with a weir adjacent the surface of the sludge, a gas lift tube extending vertically in the digester below the weir and supplying sludge to the weir which flows over it and on to the sludge in the digester, a first gas collector extending over and around and below the surface of the weir, means for heating gas externally of the digester, connections from the means for heating gas to the gas lift tube below the weir and a separate gas collector connected to the top of the digester outside of the first gas collector.

STANLEY E. KAPPE.

References Cited in the file of this patent

UNITED STATES PATENTS

| Number | Name | Date |
|---|---|---|
| 1,820,976 | Imhoff | Sept. 1, 1931 |
| 2,188,847 | Streander | Jan. 30, 1940 |
| 2,538,412 | Cecil et al. | Jan. 16, 1951 |

FOREIGN PATENTS

| Number | Country | Date |
|---|---|---|
| 441,851 | Germany | of 1927 |

OTHER REFERENCES

Keefer: Sewage Works Journal, June 1946, pp. 236 to 238 inclusive, required, published Prince and Temon Sts.; Lancaster, Pa.